Jan. 13, 1942.　　C. MARINELLO　　2,269,630
TRANSPORTATION BODY
Filed March 23, 1940　　8 Sheets-Sheet 1
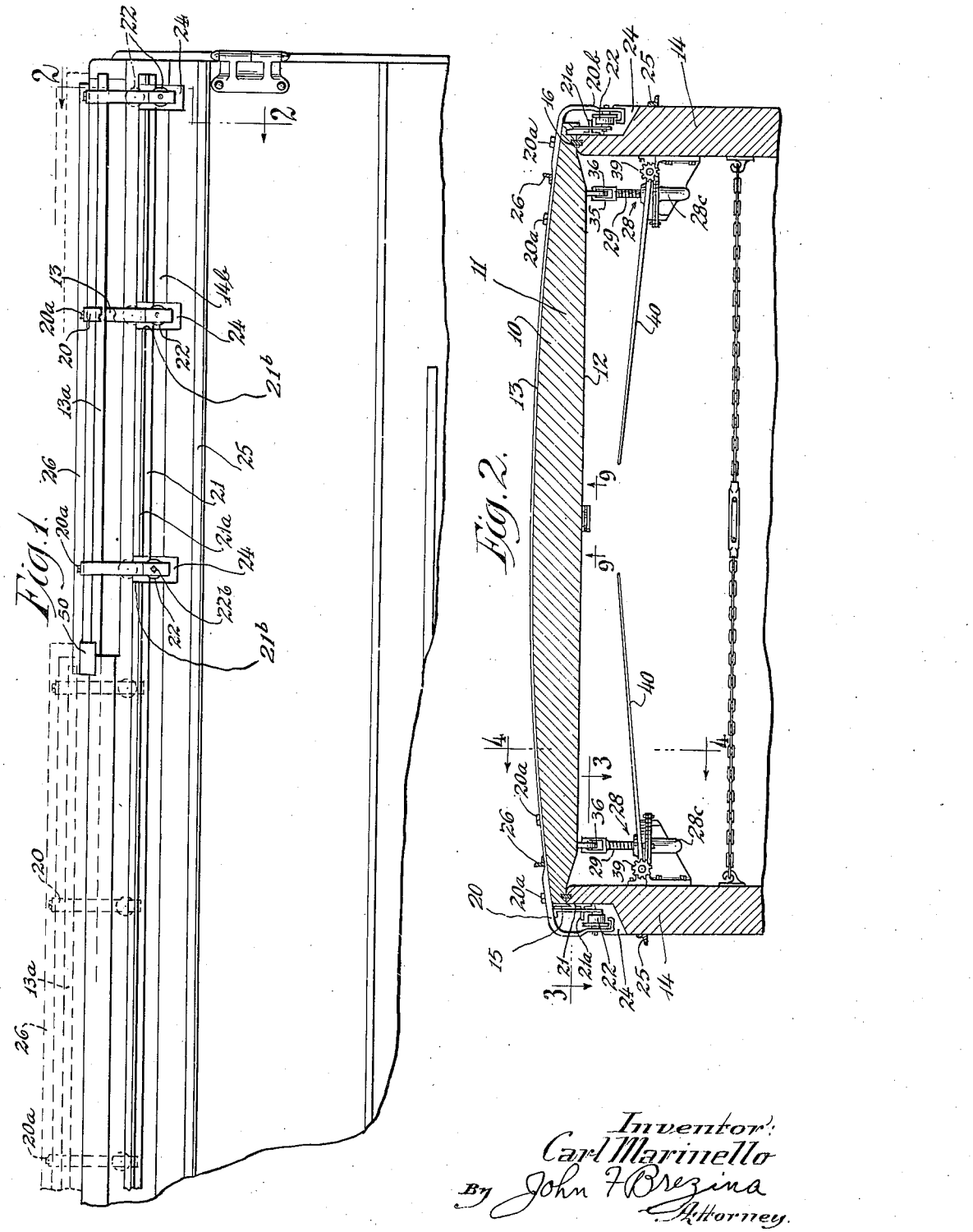

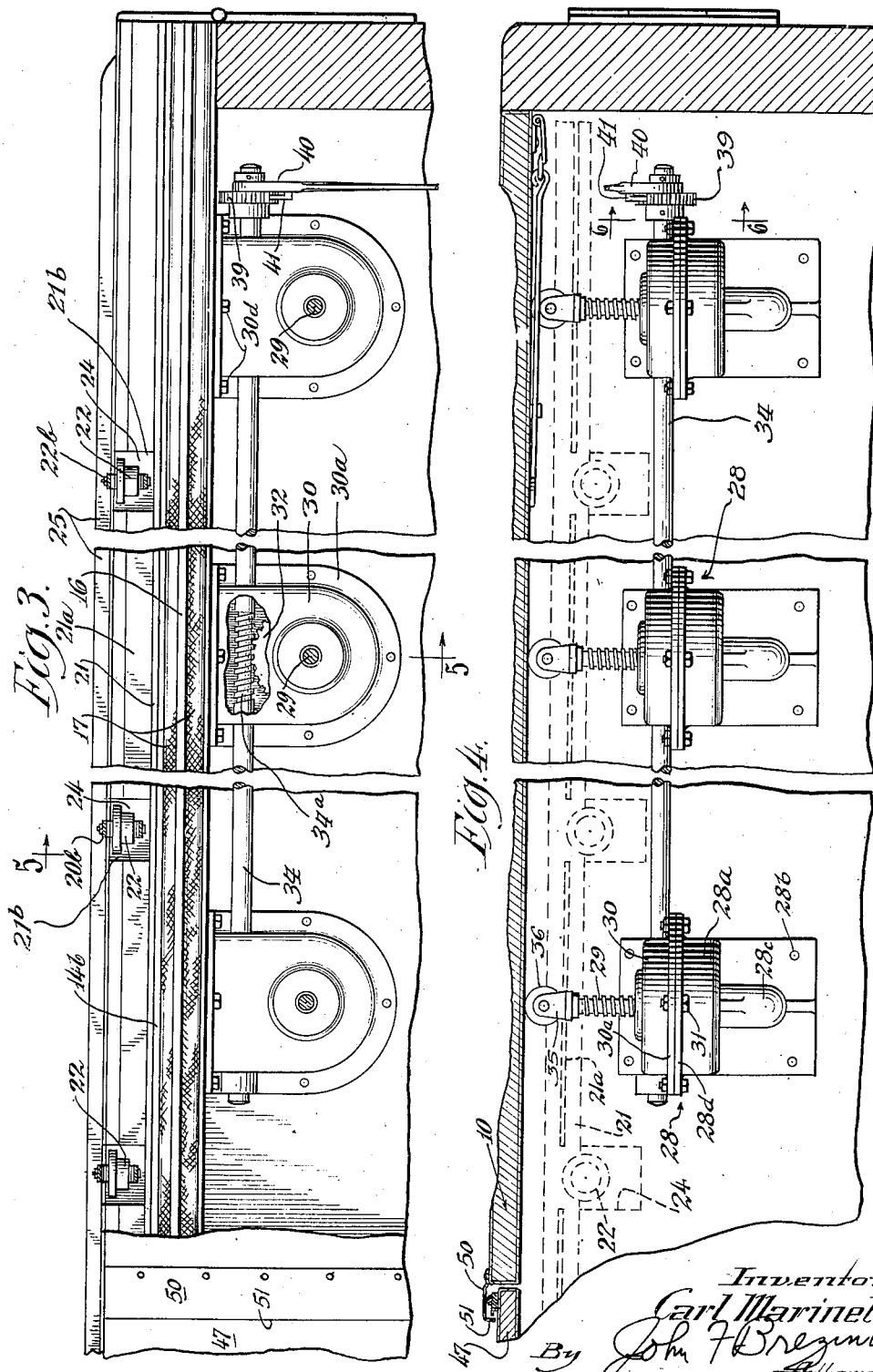

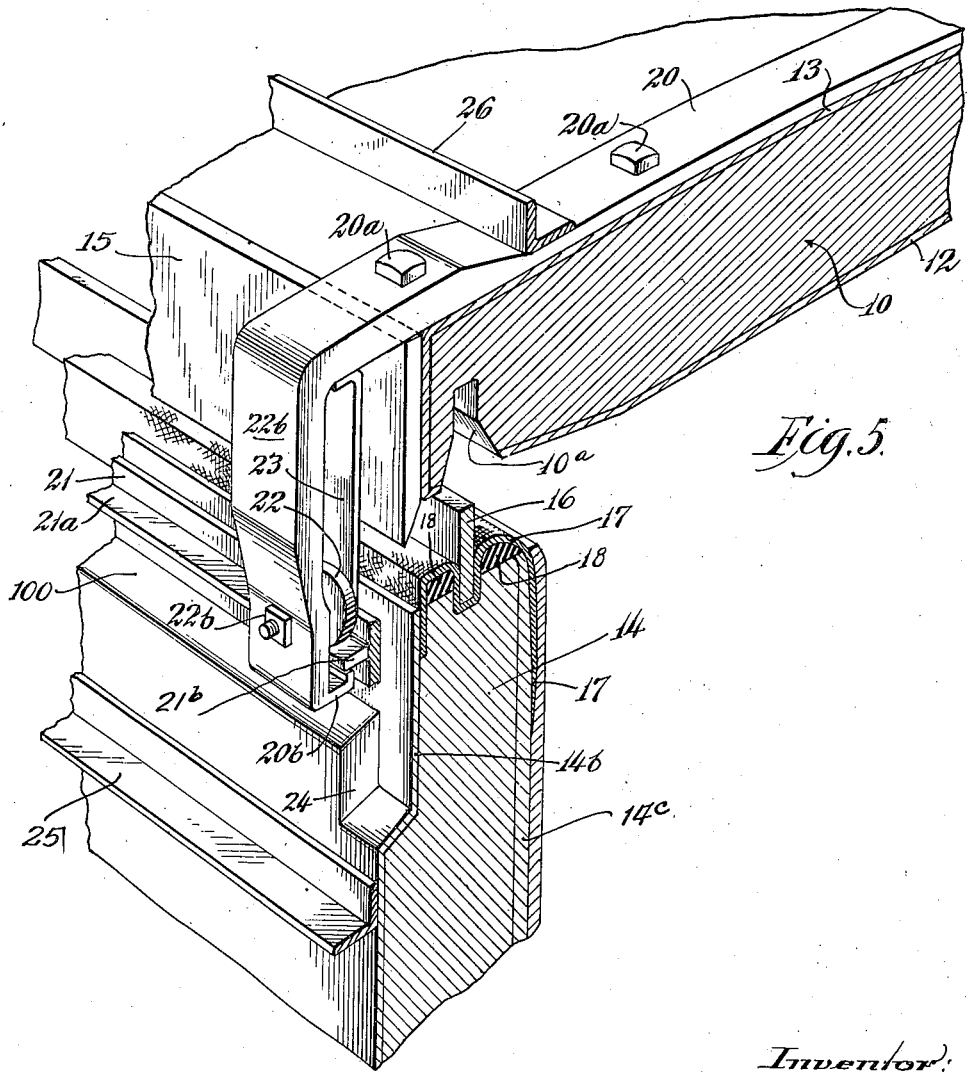

Jan. 13, 1942.　　　C. MARINELLO　　　2,269,630
TRANSPORTATION BODY
Filed March 23, 1940　　　8 Sheets-Sheet 4
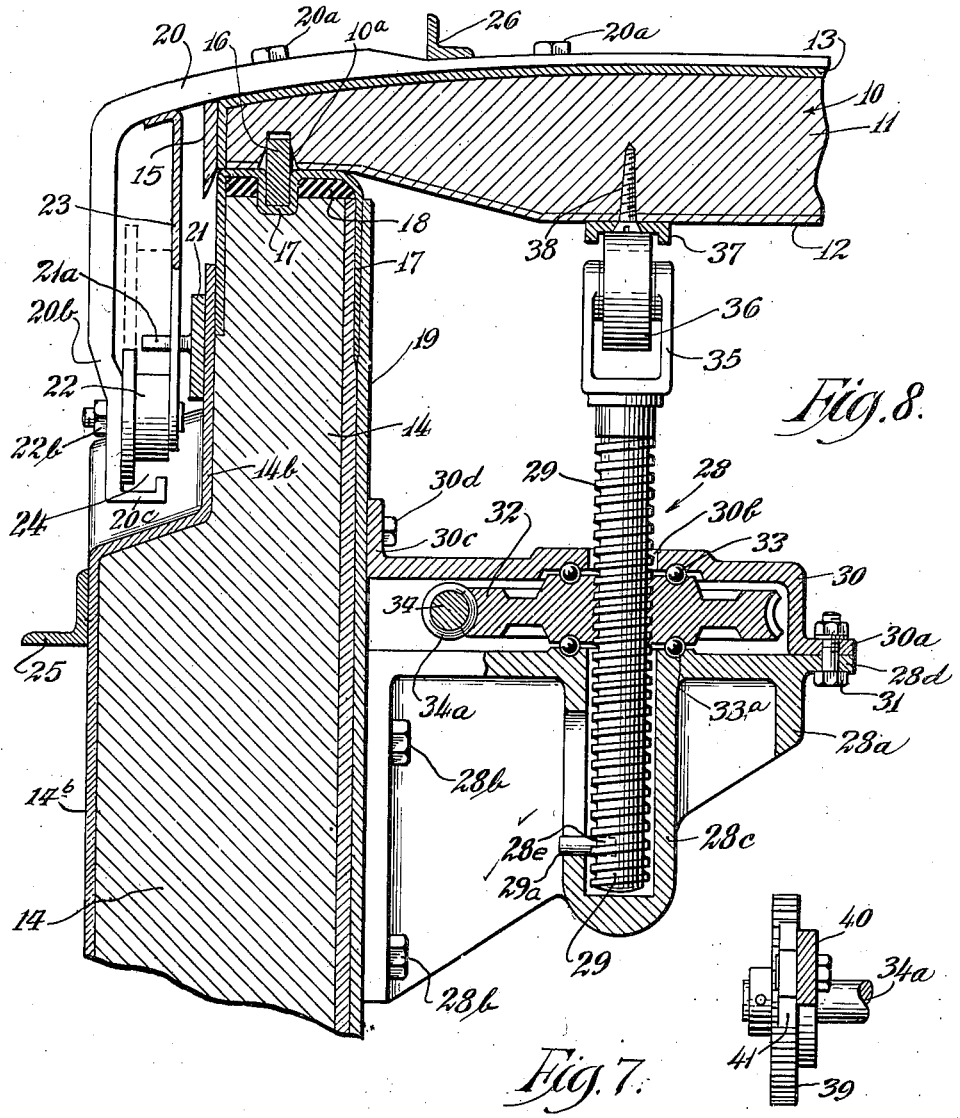
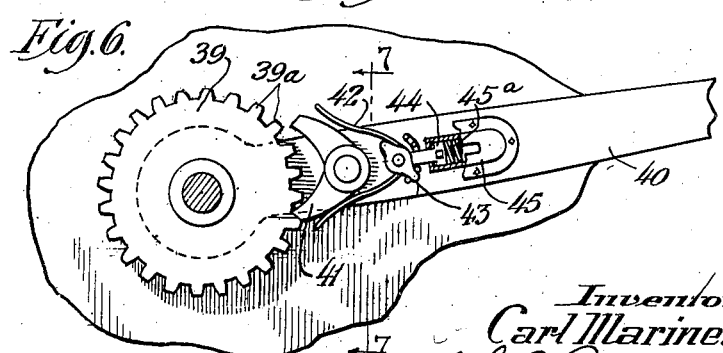
Inventor:
Carl Marinello
By John F Brezina
Attorney

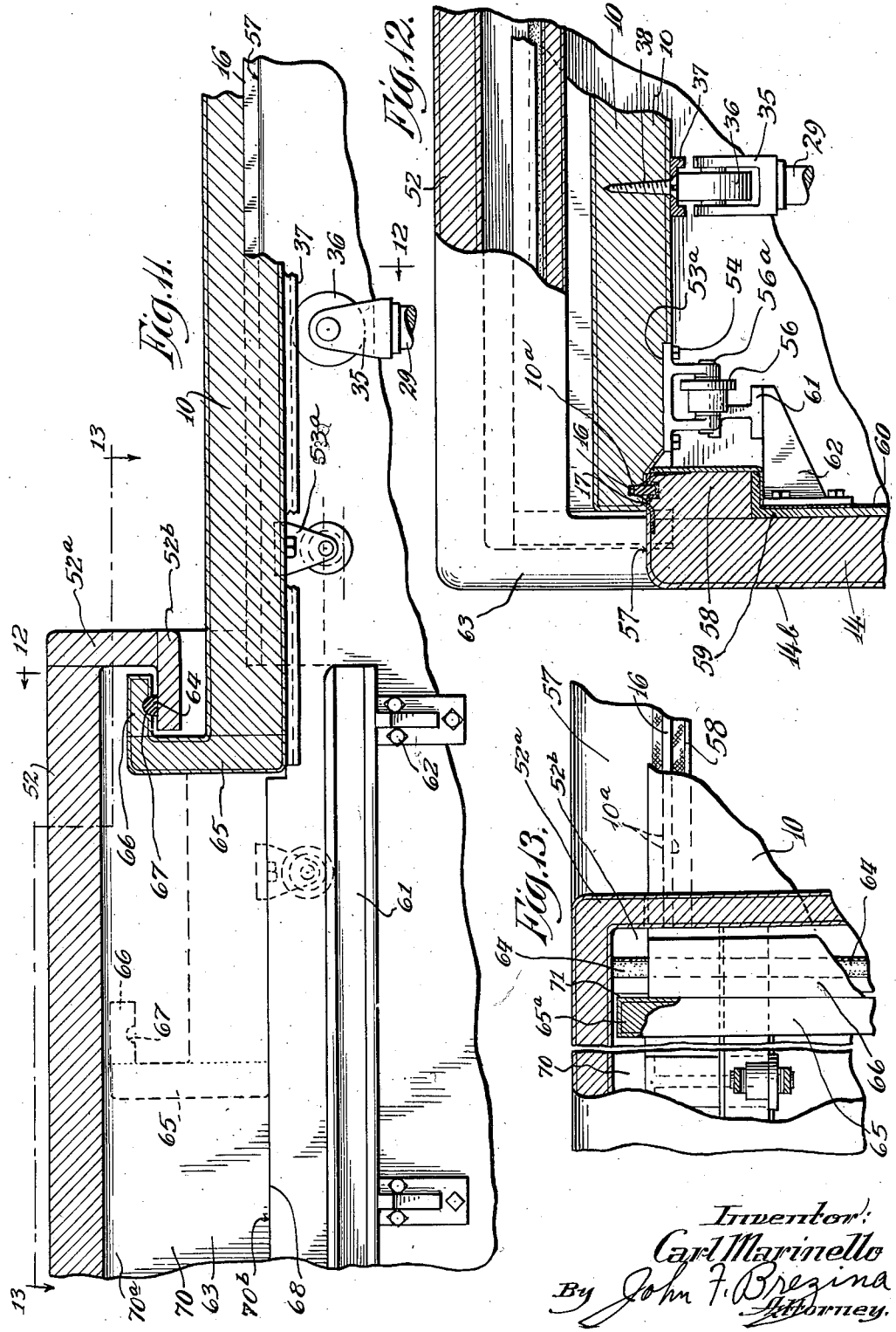

Jan. 13, 1942. C. MARINELLO 2,269,630
TRANSPORTATION BODY
Filed March 23, 1940 8 Sheets-Sheet 6
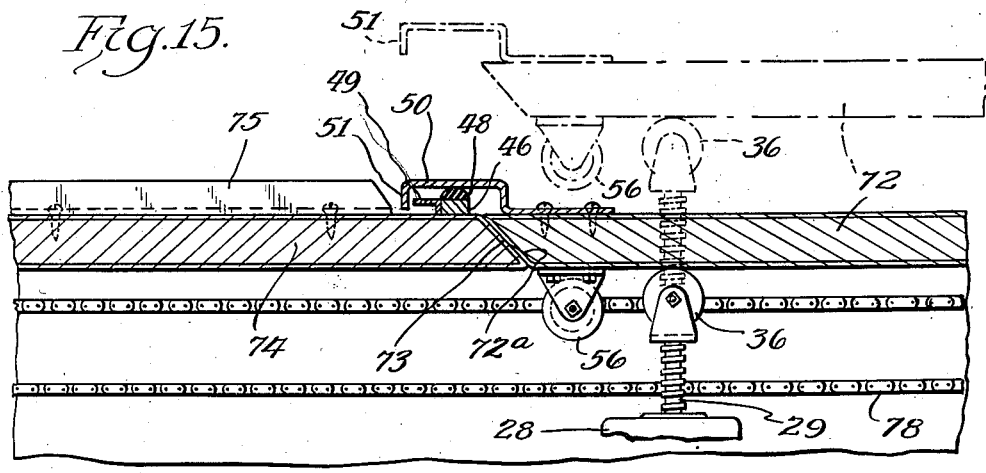
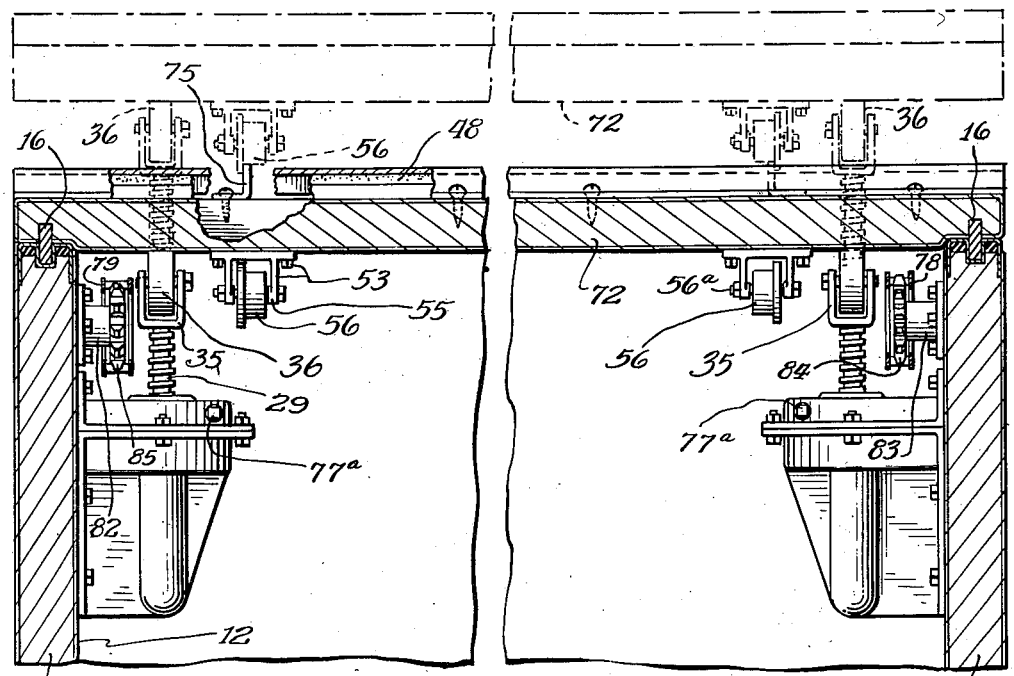
Inventor
Carl Marinello
By John F Brezina
Attorney

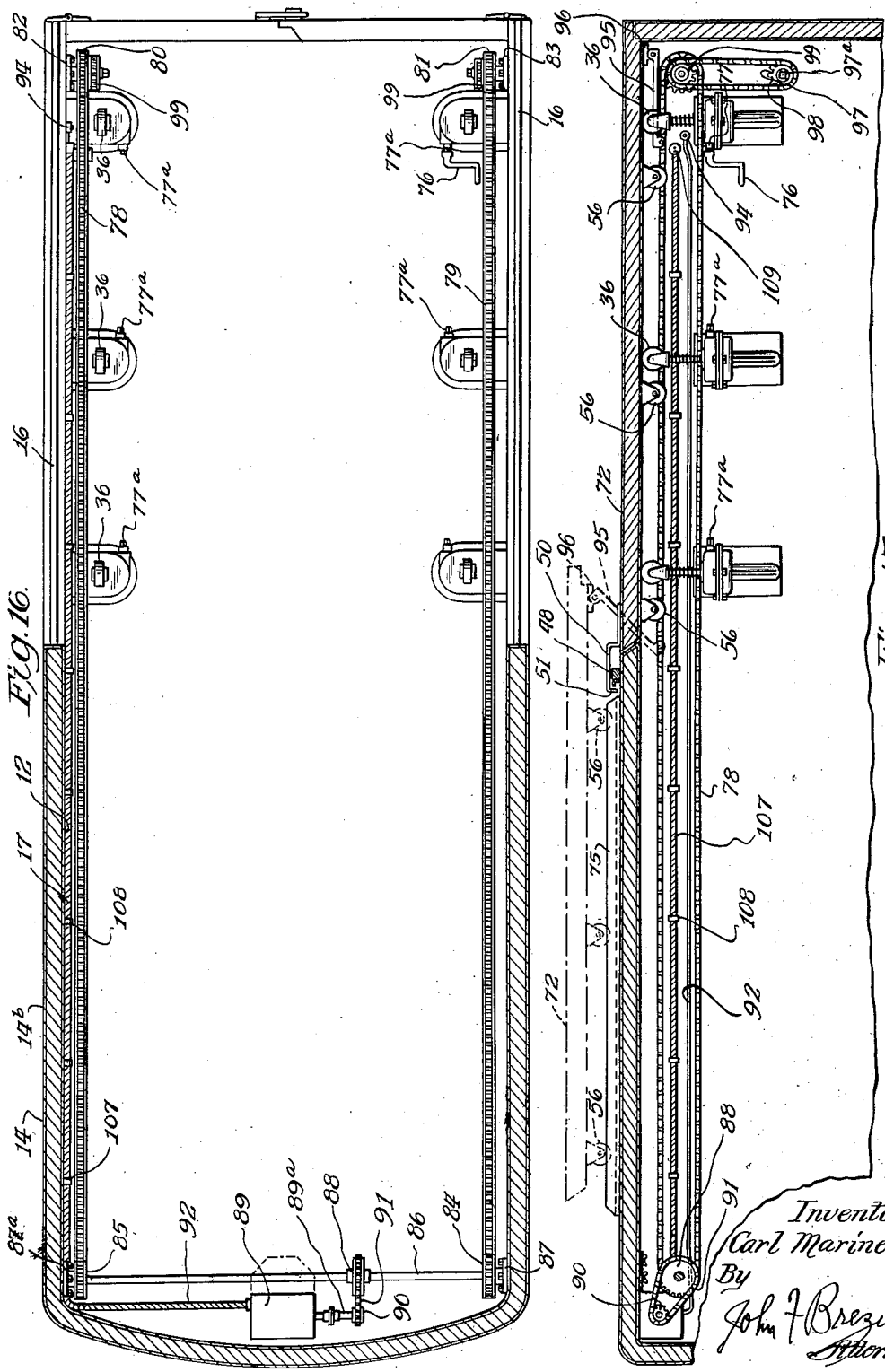

Jan. 13, 1942.  C. MARINELLO  2,269,630
TRANSPORTATION BODY
Filed March 23, 1940  8 Sheets-Sheet 8
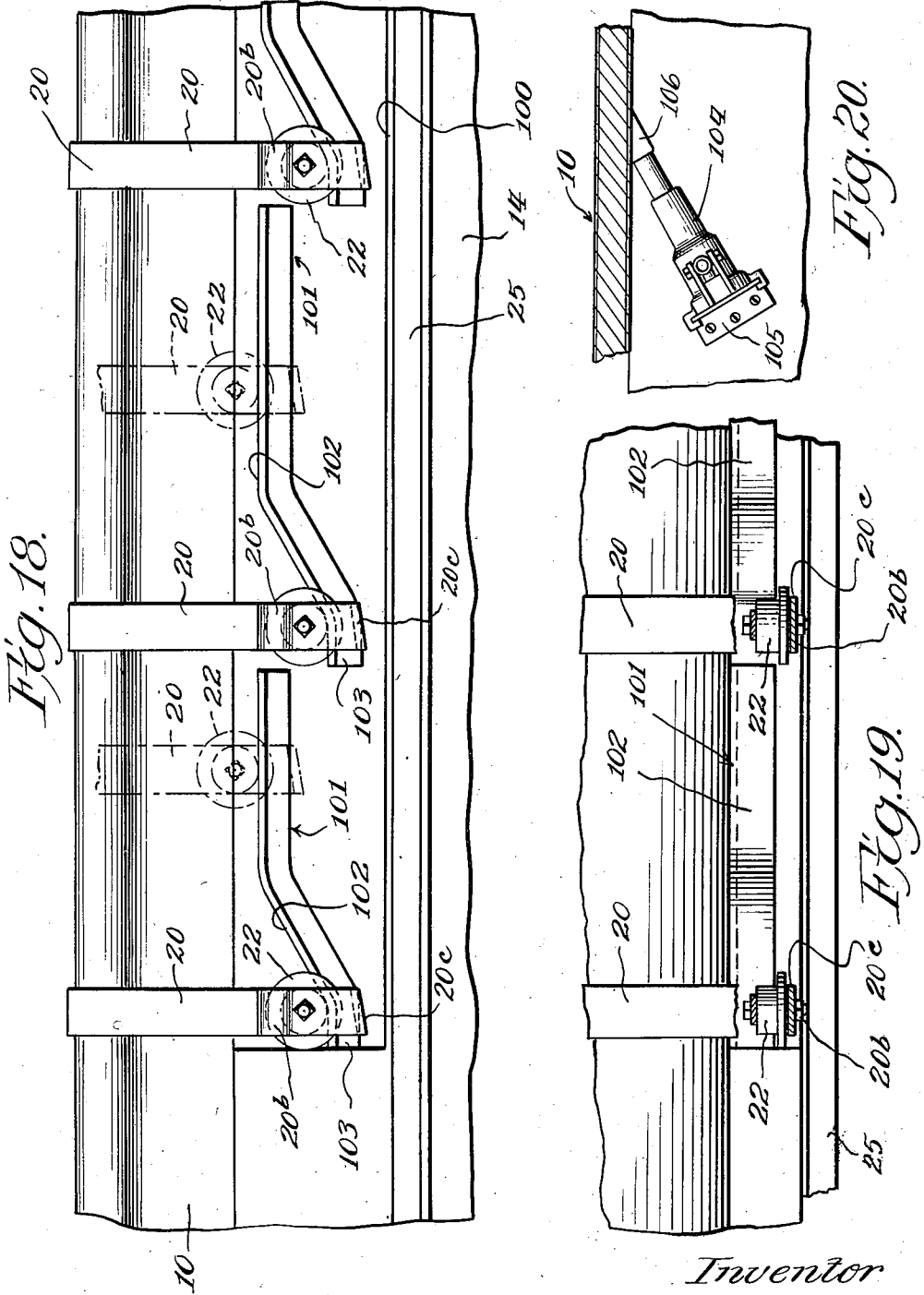
Inventor
Carl Marinello
By John F. Bregina
Attorney Patented Jan. 13, 1942

2,269,630

UNITED STATES PATENT OFFICE 2,269,630

TRANSPORTATION BODY

Carl Marinello, Chicago, Ill.

Application March 23, 1940, Serial No. 325,605

30 Claims. (Cl. 105—377)

This invention is directed to a novel transportation body adapted for use as part of railway cars, or in connection with trucks, trailers, semi-trailers and other commercial vehicle units. In particular it is directed to novel construction of the roof and associated parts, whereby either a front roof section, a rear roof section or an intermediate roof section is slidably mounted with respect to the side walls and with respect to the remainder of the roof, and provided with novel means for both rollably and stationarily mounting such movable section.

My present invention has as one of its major objects and accomplishments the provision of convertability to commercial bodies from entirely inclosed trailer, truck or other car bodies to transportation units having selectively slidable, openable roof portions or sections to permit the adaptation of the transportation unit either from a sealed refrigerator type body or other inclosed unit to an open-top type body which is necessary and important in economical loading and unloading of heavy goods, i. e. steel, large building units, lumber, machinery, etc., which large industrial factories load and unload only with cranes or power lifting devices.

My present invention further solves the problem of eliminating "dead head" returns or partial trips of heavy transportation refrigerated units, such as trucks or cars, which in one direction transport perishable commodities, such as packing-house products, and which may be converted in the described manner for over-head or vertical loading of heavy goods which conventionally are loaded with overhead mechanical equipment. Heretofore, it has been practically the invariable rule that so-called refrigerator transportation bodies transported meats packing house-products and other perishable products, i. e. dairy products, from large city areas to outlying districts and must be hauled back empty at great expense, whereas the utilization and embodyment of my invention would permit such transportation equipment, and particularly refrigerator or box-type cars and bodies to haul various heavy equipment on return loads which through economic necessity are required to be mechanically loaded from above.

A further object of my invention is the provision of the body of the car, truck or trailer with a selectively and slidably mounted section, slug, panel or roof section in combination with means for mounting the same upon the upper edges of the body side walls in a manner both to provide a seal and to prevent undesirable stresses and movement of the side walls themselves.

A further object of my invention is the provision of a movable roof section for a transportation body, which roof section may be at either end or in an intermediate position between the ends, and which in closed position rests upon the upper edges of portions of the vertical side walls, and which is provided with mounted journalled rollers which ride upon horizontally extending tracks on said side walls, either outside or inside thereof, and means whereby such movable roof section or slug is first upraised or lowered and then moved longitudinally upon the remainder of the transportation body.

A further object of my invention is the provision of a movable roof section or slug which normally forms a part of an inclosed or sealed transportation body and provided with roller members and tracks therefore, in combination with selectively operable lifting means adapted to lift or lower said roof section or slug from closed sealing position to positions permitting longitudinal sliding thereof, and which lifting means also includes a plurality of journalled rollers on which said movable roof section or slug may itself roll independently of any separate trackage means.

A further object of my invention is the provision of transportation bodies for either cars, trucks, or other vehicles in which either the front, rear or an intermediate portion of the side walls terminate at their upper edges in a sealable joint, in combination with a movable roof section or slug adapted to close such upper opening in the body, wherein the lateral edges of the movable roof section or slug in closed position rests upon or against the respective upper edges of the side walls and is provided with a cooperating sealing joint to effect a substantially air-proof and insulated seal when in closed position.

A further object of my invention is the provision of a movable slug or roof section for a transportation body which at its lateral edges is provided with outwardly opening longitudinally extending grooves which are adapted to receive metal strips mounted in the upper edges of the body's side walls, in combination with a hingedly mounted handle-bar to permit manual closing and opening longitudinal movement of said slug or roof section, and in combination with manually operable lifting and rollably supporting mechanism, whereby and whereon said movable slug and roof section may be operated from closed sealing position and moved longitudinally to open positions.

A further important object and accomplishment is the provision for a movable slug or roof section of a transportation body in which the joint or adjacent edges between the movable section and the stationary roof portions are provided with an effective weather-proof and substantially air-proof seal, which incloses a suitable flange on the movable section and sealing elements on the stationary portion cooperating with said flange.

Other and further objects and accomplishments of my invention will be apparent from the following description and appended claims.

Fig. 1 is a side elevation of the upper portion of a transportation body, which body in this illustration is of the refrigerator type, and showing the movable roof section in closed sealing position and showing such slug or roof section in dotted lines in its open position.

Fig. 2 is a cross-section view taken on line 2—2 of Fig. 1 and on a transverse vertical plane of the upper portion of a transportation body and illustrating manually operable lifting and rolling units in side elevation.

Fig. 3 is a top plan and fragmentary view on line 3—3 of Fig. 2 with parts broken away of one side wall and corner of a transportation body embodying one form of my invention, and showing a novel mechanism mounted on the side walls for both lifting and rollably supporting the movable slug or roof section in open or partially open positions.

Fig. 4 is an elevational view taken on line 4—4 of Fig. 2 of the upper portion or inside of the transportation body, and having parts broken away, and illustrating the jackscrews and upper attached rollers on which the movable roof section or slug may be rolled when in open position.

Fig. 5 is an enlarged fragmentary perspective view taken partially on line 5—5 of Fig. 3 showing the upper edge portion of one of the side walls in cross-section and also showing a segment of the movable slug in cross-section.

Fig. 6 is an enlarged cross-sectional view of the manually operable means for operating said jacks and taken on the line 6—6 of Fig. 4, and looking in the direction of the jackscrews.

Fig. 7 is an enlarged fragmentary view taken on line 7—7 of Fig. 6, and illustrating the manually operable hand-lever and ratchet mechanism for rotating the longitudinally extending shaft to in turn operate the lifting and rolling devices illustrated in Figs. 3 and 4.

Fig. 8 is a cross-sectional and fragmentary view taken on line 5—5 of Fig. 3 and showing a fragment of the upper corner in enlarged form and showing rollers journalled on the jacks and cooperating tracks on the movable slug.

Fig. 9 is an elevational view of the hingedly mounted handle element, whereby the movable slug or roof section is moved longitudinally in either direction.

Fig. 10 is a fragmentary cross-sectional view illustrating the upper corner of the movable slug or roof section with mounted flange, and sealing element and cooperating flange upon the stationary portion of the roof to provide a weather-proof and substantially air-proof seal or joint.

Fig. 11 is a vertical cross-sectional view, taken longitudinally of the truck body and showing a fragment of the inside surface of the side wall in elevation, and having particular reference to the form in which the movable slug is adapted to slide into the upper portion of the transportation body and beneath the stationary roof portion.

Fig. 12 is a vertical cross-sectional view of the corner of the transportation body showing certain parts in elevation, and taken on line 12—12 of Fig. 11.

Fig. 13 is a cross-sectional view taken on the horizontal plane indicated by line 13—13 of Fig. 11.

Fig. 14 is a cross-sectional view taken on a vertical plane illustrating the form of the movable slug construction substantially similar to that illustrated in Figs. 2 and 8, though utilizing bracket mounted rollers mounted on the end of the vertical jacks, as partially illustrated in Figs. 11 and 12, and utilizing bracket mounted rollers on the bottom surface of the movable slug for engaging the longitudinal exterior rails indicated.

Fig. 15 is a cross-sectional view taken longitudinally of the intermediate portion of the transportation body and illustrating the sealing joint between the movable roof section and the stationary portion thereof.

Fig. 16 is a view taken from above showing the upper edges of the rear portions of the side walls in a plan view and showing the forward portions of the body side walls in horizontal cross-section, and illustrating means and mechanism for selectively and optionally manually elevating the movable roof section and for moving the same longitudinally to or from position over said stationary roof portion.

Fig. 17 is a vertical cross sectional view taken on a longitudinal plane of the upper portion of the transportation body, and showing inside elevation of the upper portion of Fig. 16.

Fig. 18 is a side elevational view looking at the exterior of an upper intermediate upper portion of the transportation body having the herein described exteriorly slidable movable slug thereon and illustrating a slightly modified form of slidable track or rail units.

Fig. 19 is a fragmentary top plan view showing a portion of the movable slug and two of the angular track or rail sections.

Fig. 20 is a fragmentary side elevational view of an intermediate portion of the side wall of the transportation body looking at its inner surface, and showing a portion of the movable slug in vertical cross section.

The reference numeral 10 designates a movable roof section or slug which is preferably formed of a plurality of spaced apart parallel transverse trusses or bars 11, inner sheet metal wall 12, and outer sheet metal wall or covering 13, with downwardly turned lateral edges 13a. In the refrigerated type of transportation body, the spaces between the inner and outer walls of the slug or roof section 10 and between the respective transverse trusses are filled with suitable insulating material to effect greater efficiency in insulating the interior of the transportation body against the exterior atmospheric condition.

The movable slug or roof section 10 may be of any desired size, and may be either mounted over the rear portion, front portion or intermediate portion of the transportation body, depending upon whichever is desirable and adaptable for the particular uses. The width of the movable roof section may be greater or less than the distance between the upper edges of the vertically extending side walls 14, which define the inner surface of the side walls 14. Two longitudinal strips 18 and 19, preferably of rubber or other yieldable material are secured on opposite sides of the sealing bar 16 as illustrated. The outer lower edge portion of the fabric 17 is mounted in and held in position by securance of the outer metal wall portion 14b, which is suitably secured in position upon the framework (not shown) of the side wall itself.

Reference numeral 14c, illustrated in Fig. 5, designates a layer of plywood or equivalent material which is nailed or otherwise suitably secured to the framework trusses forming part of the side wall itself.

The outermost sheet metal wall 13 of the movable slug 10 has its lateral edges bent angularly and downwardly to form integral flanges 12a, as clearly shown in Figs. 5 and 8. Reference numeral 15 designates one of a pair of longitudinally extending guarding bars or strips which are suitably secured against each of the lateral edges of the movable slug 10, each of the strips 15 having its lower edge preferably extending downwardly a short distance below the undersurface of the movable slug so that the inner surface thereof normally lies opposite the upper edge of the exterior face of the canvas or fabric liner 17. This provides a protective element against snow, moisture, etc. from initial entry into the joint between the lateral edges of the movable slug and the fabric strip 17 of each of the side walls.

Numeral 20 designates a plurality of angular brackets which are mounted at spaced apart intervals, and being preferably three (3) in number on each side of the movable slug or roof section 10. Brackets 20 are preferably mounted in non-uniform spaced apart relation, i. e., the two rearmost may be closer to the intermediate brackets than the foremost bracket to the intermediate brackets, for reasons which will be hereinafter explained. Brackets 20 have their upper portions apertured and suitably secured to the movable roof section 10 by suitable bolts or screws 20a, which said brackets have their lower portions extending downwardly and slightly offset as indicated at 20b (Fig. 5) and at the extreme lower ends are bent at right angles and horizontally to form inwardly extending integral flanges 20c, which act as stops and ride below the horizontally projecting portion of the metal tracks 21 during horizontal rolling movement of the movable slug.

The metal rail or track 21, in the preferred form, is shown as of T cross section, is suitably secured as for example by screws or the like to the upper edge of the exterior metal wall 14b of each of the body's side walls, and a short distance below the upper edge thereof, as illustrated in Figs. 1, 2 and 5. Each of the rails or tracks 21 are provided with spaced apart recesses, whose positions correspond with the spacing of the brackets 20, and which recesses permit elevation therethrough of suitable rollers 22, which are journalled on the lower ends respectively of brackets 20 by means of axial bolts 22b, as clearly shown in Fig. 5. A plurality of connecting bars 23 each have their upper ends suitably secured to the inner surface of brackets 20 respectively, and these connecting bars extend downwardly and have an aperture formed in the lower end thereof through which the axial bolts 22b extend respectively, substantially as illustrated in Fig. 5.

Numerals 24 designate a plurality of spaced apart recesses which are formed in the upper portion of each of the side walls 14, one of which is illustrated in enlarged form in Fig. 5, and which permit descent of and receive the lower ends respectively of angular brackets 20 with their respective flanged rollers or wheels 22, thus eliminating an otherwise undesirable feature of having the said brackets project transversely or horizontally beyond the plane of the outer surface of the side wall 14.

The movable slug or roof section, which as stated, may be either the forward, rearward, or intermediate portion of the roof, is shown in Figs. 1, 2, and 8 in closed and sealing position upon the body's sidewalls 14, and the upraised and open position of said movable slug or roof section is illustrated partly by dotted lines at the end of Fig. 1. When it is desired to move said movable roof section from closed seated and sealed position to either partly or fully open position, it is necessary to move said movable slug upwardly to a sufficient height so that the lower surface of the respective rollers or wheels 22 will be at least as high as the upper surface of flanges 21a of the tracks 21, whereupon a push or pull imparted to the movable roof section will move it longitudinally and cause the respective rollers 22 to ride upon track flanges 21a respectively to the desired position.

The advantage of building the recesses 24, recesses 21b of each of the rails or tracks 21 and of mounting of brackets 20 non-uniformly is to prevent the two rear-most rollers 22 from dropping into the forward and intermediate track recesses on each side of the body when the movable slug is moved longitudinally. It will be apparent that if the intermediate roller and its mounting bracket, or if all rollers 22 of a plurality thereof, were spaced equally apart, that upon longitudinal movement of the movable slug to open position or upon partial closing movement certain of said rollers 22 would drop through those recesses 21b, through which they should not drop due to the substantial weight of one or the other and of the movable roof section. This objectionable feature of operation is eliminated by the non-uniform spacing of said brackets, rollers, track recesses and external side wall recesses 24, which have been described.

Referring to Figs. 1, 2, and 5, numerals 25 designate the external reinforcing guard rails which are preferably of angular cross-section, whose major function is the protection of the external surface of the body in event of impact or collision of the body with other objects.

Reference numerals 26 designate reinforcing, longitudinally extending rails of angular cross section which are mounted upon the movable roof section 10 a short distance from the lateral edges thereof and preferably traversing and intersecting the respective angular brackets 20 as clearly shown in the drawings.

I desire that it be understood that it is within the scope of my invention to transpose the positions of the angular brackets 20 with their respective rollers and of the rails 21 to the interior of the body and along the corner junctures of the movable slug and the side walls 14, as for example, by mounting the tracks or rails 21 horizontally along the inner surfaces respectively of the side walls 14 and mounting the respective brackets 20 upon or against the inside of the movable slug or roof section 10.

As the average movable roof section or slug is of a comparatively large area in order to permit overhead loading and unloading of relatively long and large objects, its weight consequently is substantial, and I therefore provide mechanical means, operable by a single person, whose functions are to elevate the slug or roof section, as well as to provide a means on which said roof section may be rolled into open position. It is to be borne in mind that in certain forms of my invention the mechanical means provided has both the functions of holding the movable roof section 10 in elevated position and simultaneously providing means on which such roof section is rolled from its position upon the upper opening of the transportation body, and that in these embodiments these two functions are performed simultaneously.

Referring to Figs. 2 to 4 inclusive, reference numeral 28 generally designates a plurality of lifting devices of the "jack" type and which are preferably three (3) in number, mounted along each of the two side walls 14 of the transportation body. Each of said jackscrew lifting devices comprises a base portion 28a, which includes an apertured, bracket-like portion by means of which it is securely mounted to the surface of each of the side walls 14 by means of suitable bolts 28b. Each of said base portions 28a are provided with a central vertically extending well or elongated housing 28c, in which the lower ends of jackscrews 29 respectively are vertically movable, as illustrated in Fig. 8. Each of said base portions 28a is provided with an integral peripheral flange 28d, which flanges are provided with spaced apart apertures therein. A gear housing is formed by mounting upon each of said base portions 28a an annular metal cap 30, which is substantially cup shaped and each of which has an integral peripheral flange 30a, which in turn has spaced apart holes therein registered with the holes in flange 28d. A plurality of bolts 31 mount securely each of said caps 30 in a position illustrated in the drawing and form an enclosure or housing for the substantially horizontal gear wheel 32. Each of said metal caps 30 are provided with a central aperture 30b, through which its jackscrew is movable and is also provided with apertured anchoring flange 30c, whereby each thereof is secured with respect to the adjacent side wall 14 by means of screws or bolts 30d.

Each of the horizontal worm gears 32 is preferably, though not necessarily, rotatably mounted and journalled between upper bearings 33 and lower bearings 33a, as illustrated in Fig. 8. Each of the housing caps 30 are provided with, at opposite sides thereof and near the points of mounting thereof to the side walls 14, aligned openings, all of such openings of the lifting devices mounted on the same side wall being in alignment. A longitudinally extending shaft 34 is rotatably journalled in said aligned openings, and extends through all of the housing caps 30 before described, and said shaft 34 is provided with three spaced apart sets of spiral threads or spiral worm gears 34a, which are formed in the positions to lie within said housing caps and to mesh with the respective worm gears 32 so that the rotative movement of said shaft would in turn be transmitted simultaneously to said respective worm gears 32 to move the respective jackscrews 29 either upwardly or downwardly. It will be noted that inasmuch as the internal threads of the worm gears 32 engage and mesh with cooperating threads of the jackscrew 29, that rotative movement of worm gears 32 will be transmitted to vertical movement of said respective jackscrews 29 and that said jackscrews 29 are restrained from axial rotation by protecting studs 29a respectively which slide in vertical slots 28e respectively which are formed in walls 28c respectively.

Connected by welding or the like to each of the jackscrews 29 is a bifurcated bracket 35, whose upper end thereof carries opposed apertures and provides means for journalling with respect to such apertures of a roller or wheel 36, which may preferably be of relatively small diameter. Said roller or wheels 36 directly contact and engage the movable roof section or slug 10 substantially as illustrated in Fig. 4, or in the case of the slightly modified construction of Fig. 8, may bear and rollably engage the interior surface of a suitable guide track 37, which may be of inverted U shaped cross section and which guide tracks or rails 37 are secured in parallel relation upon the inside surface of the movable roof section or slug 10 and secured to the movable slug by a plurality of screws 38, passing through spaced apart apertures therein, as substantially illustrated in Fig. 8.

When means are employed such as guide track 37 for guiding the backward and forward movement of the movable roof section or slug 10, it is entirely unnecessary to build and utilize the rear portion of external tracks 21, as the movable slug or roof section 10, will during its longitudinal movement, roll upon the rollers or wheels 36 for the greater part of its path of movement. This form employing journalled rollers 36 may include and embody two track rails 21 upon the forward part of the side walls 14 respectively, so that the rollers 22 of brackets 20 will successively engage and ride upon said track rails 21 when the movable roof section is pushed forward and is open and also be supported on and ride on rails 21. The forwardly moved slug 10 may be equivalently supported on anti-friction devices, such as stationary casters (not shown) or equivalent devices, if desired, which may be provided upon the stationary portion of the roof over which the movable slug 10 is longitudinally moved.

Referring to the lifting mechanism consisting of a plurality of shaft operated jackscrews, it is desirable to provide a conveniently, quickly and easily operable mechanism for manually rotating shaft 34, with reference to the preferred form illustrated in Figs. 2, 3, 5 and 8. With particular reference to Figs. 6 and 7, I provide a ratchet wheel 39, which is securely and substantially mounted on shaft 34 (and preferably upon the end of shaft 34) which projects beyond an end of the rearmost jackscrew housing 28, said ratchet wheel 39 being provided with a plurality of ratchet or gear teeth 39a. A hand operated lever 40 has one end journalled for rotation upon the projected end of shaft 34 and immediately adjacent ratchet wheel 39, said lever carrying a pivoted double pawl 41, which is normally held to engage the ratchet teeth 39a by means of adjustable V-shaped spring 42, which spring is mounted at one end to lever 40 as clearly shown in Fig. 7.

A manually movable pivoted cam 43 is mounted for rotative movement adjacent the apex end of leaf spring 42a, said cam having diametrical opposite integral abutments, one of which is adapted to alternatively engage and press against one or the other of the arms of the leaf spring 42, as indicated in Fig. 7. The cam 43 is normally held in pressing engagement to hold V-shaped spring 42 in the desired position against pawl 41 by a spring pressed movable element 44 which is slidably mounted within a metal shield or housing 45, and normally held in said pressing engagement by a spring 45a. The housing or shield 45 is suitably secured by screws, welding or the like to the side surface of the lever 40. It will be noted that when it is desired to rotate the shaft 34 and ratchet wheel 39 in a direction clockwise in Fig. 6, the pawl 41, spring 42 and cam 43 will be in the position therein illustrated, and when it is desired to rotate said shaft 34 and ratchet wheel 39 counter-clockwise, the spring pressed element 4 is manually retracted or depressed and cam 43 rotated a partial turn until one of the integral lugs thereof presses the opposite arm portion of spring 42 to cause the arm shown as uppermost in Fig. 6 to yieldably press against the upwardly directed arm of the double pawl 41.

It will be apparent that with the foregoing lifting mechanical mechanism for operating either one or more of the lifting devices illustrated, that the lifting devices operated by each of the shafts will be operated in either upward or downward direction.

It is both an advantage and of importance to form a tight joint and one that will be weatherproof between the end of the movable roof section and the adjacent end or ends of the stationary roof portion. In Figs. 4 and 10 I have illustrated one advantageous form of construction which provides an effective and satisfactory weather-proof seal between the movable section and the remainder of the roof when in closed position.

Referring to Fig. 10, numeral 10 designates a fragment of the movable roof portion of the transportation body having its transversely extending surface and end 10b. Numeral 47 designates the end portion of the stationary body thereof, the edge of which stationary portion partially defines the opening closable by the movable roof section. Numeral 46 designates a transversely extending strip or bar, preferably made of wood, which is suitably secured by screws or the like against and upon the surface of the stationary roof portion 47, and carries secured thereon a yieldable weatherstrip 48 of suitable material, i. e. rubber or composition thereof. Said weatherstrip 48 is preferably nailed or cemented in position. Secured to the side surface of the bar 46 by screws or the like is an angular metal bar 49 of substantial right angled cross-section, the flange of said angular bar projecting in the direction opposite to the edge surface 10b and being spaced from the upper surface of the stationary roof portion as clearly shown in Fig. 10.

A transversely extending substantially flat metal cover or shield 50 is suitably secured, as by screws or equivalent fastening elements, to the edge of the movable roof section 10 and is mounted in a position so that one longitudinal edge portion of said protecting shield 50 normally projects over the normally adjacent end portion of the stationary roof 47 and over the transverse bar 46 and its secured weatherstrip 48. The extreme edge of the protecting shields 50 is turned angularly and downwardly to form the protecting flange 51 whose lower edge preferably terminates below the projecting edge of the angular metal bar 49. It will be noted that when the movable roof section 10 is in its closed position, the inner surface of the protecting shield 50 engages or rests upon the weatherstrip 48 and its integral downwardly extending flange 51 preferably projects below the projecting edge of the angular metal bar 49, as clearly shown in Fig. 10, this engagement forming an effective weather-proof seal. When the movable roof section 10 is raised in the manner hereinbefore described, the same will assume substantially the position illustrated in dotted lines of Fig. 10, said movable section being elevated to such a height that the lower inner surface of the movable roof section 10 will clear the weatherstrip 48 to permit free sliding movement.

Fig. 11 illustrates a vertical cross section view of an intermediate upper portion of the transportation body embodying features of my invention.

Fig. 12 is an enlarged partially cross sectional view illustrating my invention in a form slightly modified from that of Figs. 1, 2, 5 and 8. Fig. 12 together with Figs. 11 and 13 illustrate the transposal of the movable roof section 10 to movement beneath the remaining and adjacent stationary portion of the body roof. In this embodiment, the movable slug or roof section 10, which is of preferably substantial rectangular form, is of a width narrower than the intermediate width dimension of the major portion of the transportation body so as to permit said movable roof section 10 to slide beneath the adjacent stationary body roof portion 52. It will be noted that the stationary roof portion 52, whether it be the back, front or an intermediate part of the entire roof, is built substantially higher than that portion of the transportation body which is normally covered by the movable roof section; namely, those portions of the side walls 14 upon which the movable roof section normally rests terminate substantially short of and below the stationary roof thereof and ceiling thereof, and form upwardly facing surfaces 57 and longitudinally and inwardly extending shoulders 58. Each of the longitudinal inwardly extending shoulders 58 are preferably formed by suitably mounting a horizontal truss, of either wood or metal, upon the upper-most interior surface of the shorter side wall portions 14, so that said shoulders 58 extend only along the inside of the shorter side walls 14 and so that same normally lie only beneath the seated movable roof section.

Numeral 59 designates one of a plurality of right-angled brackets which are mounted in spaced apart position, as indicated in Fig. 12, at the corner juncture of the respective spaced apart trusses of the side wall 14 and the respective longitudinal trusses forming shoulders 58, and these respective brackets are secured by suitable screws or bolts in the vertical trusses of the side walls and form a rigid support for the longitudinal trusses 58.

The upper surface of each of the longitudinal trusses 58 is provided with an upwardly opening groove 59a extending over the entire length of each of said trusses in which is mounted a longitudinally extending sealing bar 16 whose upper portion projects above the surface 57 respectively. Prior to the mounting or wedging-in of sealing bar 16, I mount a longitudinally extending fabric strip 17 over each of the longitudinal grooves 59, and thence drive-in each of the metal sealing bars 16 into its adjacent groove 59 so as to drive into said groove the intermediate portion of the fabric strip and impinge and secure each of the sealing bars 16 in mounted position. The inner lateral edges respectively of the fabric strips 17 are turned downwardly along the inner edges respectively of the shoulder trusses 58, as indicated in Fig. 12, and the upper edge portion of each of the inner-most sheet metal linings or inner-most side walls 60 are overlapped and suitably secured to hold said lateral longitudinally extending fabric edges beneath the same.

The other lateral edge portion of each of the fabric strips 17 are secured and protected by the longitudinally extending extreme edge portion of the outer sheet metal wall 14b, the upper surface of which outer sheet metal walls 14b forms upper surfaces 57 respectively.

It is to be noted that the movable roof section 10 is provided with longitudinally extending sealing recesses 10a along and adjacent its side edges and which open downwardly and are spaced so as to receive and cooperate with the upwardly projecting portions of the sealing bars 16 so as to provide an effective weather-proof seal between the movable roof section when seated and the shorter side walls 14.

The movable roof section 10 is in this embodiment adapted to be moved in upward and downward direction and to and from seating and sealing position by manually operated mechanical jacks of either conventional construction or lifting devices including jackscrews which are of the general type, as for example that illustrated with reference to Figs. 2, 3, 4, and 5 and hereinbefore described. The upper end of the movable screws 29 of said lifting devices respectively have suitably secured thereon as by welding or the like, the same journalling brackets 35 and the journalled rollers 36 thereof as described with reference to Fig. 5. The movable roof section or slug 10 carries the same longitudinally extending pair of parallel rails 37 which are preferably of U shaped cross-section so that the flanges thereof extend downwardly and provide guide rails to guide longitudnal movement of the movable slug when the same is rolled upon the respective rollers 36.

Referring to Fig. 12, a plurality of U shaped metal journalling brackets 55 having integral apertured flanges 53a, shown partially in cross-section in Fig. 12, and preferably four or more in number, and preferably two or more thereof along each side of the movable roof section 10, are mounted and secured on the inner face of movable slug 10 by bolts 54 respectively which pass through or into spaced apart trusses of the movable roof section 10, as indicated in Fig. 12. The annular flanged rollers 56 are journalled as indicated in axial bolts 56a of the U shaped journalling brackets 53.

As shown in Fig. 11, reference numeral 61 designates one of a pair of longitudinally extending track rails which are mounted by a plurality of metal mounting brackets 62 on the inside surfaces of the forward portions 63 respectively of the vertical side walls 14 of the transportation body. Each of these track rails are of a length to extend only from a point substantially below the juncture of the movable roof section when in sealing position and the adjacent end of the stationary roof section, and extend preferably horizontally toward the end of the transportation body for a sufficient distance to permit rolling thereon of the movable roof section 10 to maximum open position.

It will be noted from the cross-sectional view of Fig. 12 that the track rails 61 (only the end of one of which rails are shown in this view), are mounted in such position upon the respective brackets 62 that the rollers 56 are adapted to successively engage and to ride on rails 61 respectively when the movable roof section is moved to forward open position.

Referring to Figs. 11 and 13 respectively, it is to be noted that inasmuch as the forward body side wall portions 63 are substantially taller than the rear shorter portions of side walls 14 which are below the seated movable roof section, that means must be provided for effecting a weather-proof seal between the movable roof section 10 and stationary roof section 52. I will now describe this means or separable joint.

Secured to the rear-most end of the stationary roof section 52 is a transversely and downwardly extending truss which forms the wall portion 52a, and which in turn has secured on its downwardly facing lateral edge end, a horizontally and forwardly extending flange member 52b, whose inner face opposes the inner surface of the stationary roof section 52. The upper surface of the flange member 52b is provided adjacent its free edge with a suitably secured transversely extending weather and sealing strip 64, which sealing strip is of suitable rubber or other composition.

Secured to the adjacent end of the movable roof section 10 as by nailing, screws, bolts or the like is a transversely extending cross bar 65, whose lower edge terminates substantially at the lower face of the movable roof section and whose opposite edge portions extends upwardly to a plane slightly above the upper surface of the flange member 52b. A cross truss forming a transverse flange member 66 has one of its lateral edges suitably secured to the upper edge of the cross bar 65, and the major portion of this flange member 66 overlies the upper surface of the flange member 52b. A suitable groove 67 is formed longitudinally in the lower face of the flange member 66, and transversely of the truck body, and this groove is adapted to receive and cooperate with the sealing strip 64 when the movable roof section is lowered to closed position. The sealing strip 64 and the downwardly opening groove 67 form an effective weather-proof seal when the movable roof section is in sealed position in so far as the horizontal portion of the movable roof section is concerned.

It is to be noted that the construction of the stationary cross truss 52a and the flange member 52b is such as to provide a recess of sufficient depth so as to permit elevation of the flange member 66 within said recess when the movable roof section is moved upwardly prior to longitudinal rolling movement. The partially open position of the movable roof section 10 is illustrated in dotted lines at the left of Fig. 11.

Side wall portions 63 are so constructed that each thereof are narrower from the respective corner junctures with the body floor and extending to the respective longitudinal shoulders 68, which shoulders 68 are of a height slightly less than the upper surfaces 57 of the shorter walls 14, which normally lie below the movable roof section. The construction forms a longitudinal recess 70 in the upper portion of each of the forward side wall portions 63, the upper and lower limits of one of these recesses being indicated by reference numerals 70a and 70b in Fig. 11.

A partially cross-sectional and fragmentary view is shown in Fig. 13 and taken on line 13—13 of Fig. 11, and showing the outer cross bar 52a partially in cross section and the inwardly extending flange member 52b having portions of the sealing strip 64 mounted thereon. The upper surface of the movable inwardly extending flange member 66 is shown, and the transversely extending movable cross bar 65 is indicated in dotted lines below the left-hand edge of the inwardly extending flange member 66. It is to be noted that the length of the transversely extending cross bar 65 is such that each of its ends 65a extend into the recesses 70 respectively and ride therein, and that when the movable roof section 10 is moved into closed position each of the ends 65a of the cross bar 65 engages and rests against the adjacent flat end surface of adjacent recess 70, these cooperating recesses being indicated in Fig. 13 at the point indicated by reference numeral 71. These cooperating opposed engaging faces at 71 in Fig. 13 form effective weather-proof seals extending in a vertical direction between the cross bars ends 65a of movable roof section 10 and the stationary side wall portions 63, and thereby complete a satisfactory and effective sealing means between the movable roof section and the stationary parts of the transportation body.

*The operation and movement of the movable roof section*

When it is desired to move the movable roof section 10 from closed sealed position, the respective jack devices (which may be of conventional type) are normally operated to elevate the respective brackets 35 and rollers 36 upwardly to elevate the entire movable roof section 10 a short distance upwardly, whereupon the movable roof section 10 is pushed or pulled longitudinally and under the stationary roof portion 52. After this is done, the respective rollers 56 will successively engage the track rails 61 on the adjacent side, and said rollers 56 will ride on the respective track rails 61 to rollably support the movable slug 10 on side wall rails 61 permitting the said movable slug 10 to be moved to entire open position and in juxta-position below the stationary roof portion 52.

When it is desired to mount the movable roof section 10 in closed sealed position, the same is moved longitudinally, either manually or by suitable power means, to a position immediately over the opening and over its normally sealed position, whereupon the jack devices are operated in a reverse direction to lower the movable roof section or slug 10 into the position partially illustrated in Fig. 12, whereupon the sealing strip 64 will be engaged by the recess 67 in the movable flange member 66.

*Description with reference to Figs. 14 and 15, and of manually operable means and power driven means for moving movable roof section*

Referring to Figs. 14 and 15, the body side walls 14 are shown in vertical cross section having their upper edges centrally grooved and having one of the longitudinally extending metal sealing bars 16 mounted within each thereof to project as previously described with reference to Figs. 5 and 8. Mechanical lifting elements, hereinbefore referred to also as lifting jacks similar or equivalent to those illustrated in Figs. 3, 4 and 8 are mounted on the inside surface of the respective vertical side walls 14 and have mounted therein the respective and vertically movable screws 29, each of which have secured on the upper end thereof the U-shaped journalling brackets 35 respectively which in turn carry the rollers 36 journalled therein. These lifting elements may be either individually and separately actuable or in alignment mounted on one side wall connected for joint simultaneous operation through the means of a common drive shaft 28 which is shown in Figs. 3 and 4.

Referring to Fig. 14, the upraised dotted line position thereof refers to the preferred elevated position of the movable slug to which position said slug 72 has been raised by vertical movement through operation of the lifting elements. Referring to Fig. 15, it is to be noted that the end of the movable slug 72 is bevelled to form forwardly inclined edge 72a which in seated sealed position engages and rests upon an opposed correspondingly inclined bevelled end surface 73 of the stationary roof portion 74.

The joint formed by the cooperating inclined bevelled surfaces 72 and 73 is preferably sealed in the manner illustrated in the fragmentary view of Fig. 10, namely by means of the transversely extending protecting and guarding shield 50, one of whose edge portions are suitably secured upon the upper surface of the movable slug 72 substantially as illustrated, and whose downwardly bent integral edge flange 51 projects downwardly to within a short distance of the surface of the stationary roof 74. The transversely extending sealing bar 46 is secured substantially along the edge of the upper surface of the stationary roof 74, and has secured thereon the upwardly facing sealing strip 48 which is preferably of suitable yieldable and resilient composition material which is engaged by the inner surface of the metal protecting shield 50 as previously described. The angular bar 49 is secured to the side surface of the sealing bar 46 and having one of its flange portions extending substantially horizontally so that it forms a baffle-like obstruction to rain, snow, etc., which enters below the edge of flange 51.

The stationary portion of the roof 74 is provided with a pair of parallel metal tracks 75, which may take the form of standard right angle bars, as clearly shown in Figs. 14 and 15 and which provide the exterior tracks upon which the movable slug and its rollers 56 roll when moved over the stationary portion of the roof.

With further reference to Figs. 14, 15, and 17, the movable slug 72 is provided upon its inner surface with the secured substantially U-shaped journalling brackets 55 which are secured as by screws or bolts 53 in aligned positions on the inner surface of the movable slug 72. The journalling brackets 55 carry the journalled flanged rollers 56, and these brackets and rollers on each side of the movable slug are so spaced that they will ride upon the exterior tracks 75 respectively in longitudinal movement of the movable slug.

It will be apparent that when the movable slug is elevated either by manually operable or power driven means through elevation of the jacks or elevating elements to a height permitting successive rolling engagement of the respective rollers 56 upon exterior tracks 75, that the movable slug may be pushed or pulled into complete open position and again returned to an elevated position above the normal sealed position of the movable slug 72. When such returned elevated position is attained, the elevating devices may be operated either manually or by power means hereinafter referred to to place and mount the movable slug 72 into sealing position with respect to the side walls and with respect to the stationary portions of the roof.

Referring particularly to Figs. 16 and 17, Fig. 16 shows the movable slug entirely removed and with the inside of the transportation body exposed, and further shows the forward portions of the side walls in cross section, the respective spaced apart vertically extending walls thereof being likewise shown in cross section. The inner sheet metal side walls 12 and the outer sheet metal side walls 14b are designated by the numbers hereinbefore affixed thereto with reference to other views of the drawings. The upwardly projecting sealing bars 16 mounted in the upper edge of the rear portions of the side walls 14 are shown in top plan view in their position as described with reference to Figs. 5 and 8 respectively.

The forms of slug or closure constructions illustrated and described with reference to Figs. 1, 2, 3, 4, 5 and 8 and also the slightly modified form in Figs. 14 and 15, are adapted to be moved vertically as well as longitudinally by both power driven as well as manually actuable and manually operable means, one form of each of which I will now describe with reference to Figs. 16 and 17 in which such means and mechanism is illustrated.

In Figs. 16 and 17 I illustrate in the right end portion thereof the elevating units for raising and for permitting lowering of the movable slug such as has been described with particular reference to Figs. 3 and 4, but in which form these individual lifting units are independently and manually operated by means of a suitable hand crank 76 which is adapted to be removably mounted upon the non-round projecting ends 77a of spirally threaded stub shafts 77, each of which stub shafts are provided with spiral threads as indicated at the center of Fig. 3 and which threads mesh with and rotate the respective gears 32 of the elevating units 28.

It is to be borne in mind that certain of the elevating devices, for example the two thereof which are transversely opposite each other within the transportation body, may be first operated to elevate one end of the movable slug a limited distance and this operation repeated successively as to other elevating units on the side walls of the transportation body until the movable slug has been elevated to the desired height. Likewise, satisfactory operation is attained by simultaneous and manually operating first the two foremost elevating devices, that is the ones at the forward end of the movable slug, and thence operating the other elevating devices correspondingly until the desired height and level of the movable slug is attained.

As illustrated in Figs. 16 and 17, one preferred form of mechanism, including optionally a power driven means and a manually operable means, is formed for longitudinally moving the movable slug either over the stationary portion of the roof (or under the stationary roof portion as to the form illustrated in Figs. 11, 12 and 13) and consists of a pair of endless link chains 78 and 79 respectively which are rotatably mounted at the rear end thereof upon sprockets 80 and 81 which sprockets are journalled respectively for rotation on suitable journalling posts or shafts (not shown) each of which journalling posts are mounted in perpendicular position with respect to the side walls in mounting flanges 82 and 83 respectively. Said mounting flanges are suitably secured as by screws to the inside surface of the body side walls preferably adjacent the upper rear corner as indicated in Fig. 17.

The respective endless link chains 78 and 79 are journalled at the upper forward corners of the transportation body and adjacent the sides thereof upon a pair of sprockets 84 and 85 respectively which sprockets are secured upon a transversely extending rotatable shaft 86, the opposite ends of which shaft are journalled in wall flanges or brackets 87 and 87a as clearly shown in Figs. 16 and 17. The rotatable shaft 86 has secured thereon at a suitable intermediate point a sprocket wheel 88, and said shaft is adapted to be rotated in either direction by an electrical motor 89 which is shown only in outline form, and which is provided with suitable automatic self operating reversing and circuit breaking mechanism such as for example conventionally used to open and close garage doors. The shaft 89a of motor 89 projects outwardly and has mounted thereon a relatively small sprocket wheel 90 which is in alignment with the sprocket wheel 88 and a suitable endless link chain 91, is mounted to transmit rotative movement of said electric motor to said rotatable shaft 86 and in turn to move the endless link chains 78 and 79 the desired distance in either direction, the extent of rotation of the motor and rotation of the transverse shaft 86 being predetermined and gauged by the extent of movement of the endless link chains 78 and 79 respectively. In other words, the reversing mechanism (not shown) is so adjusted and set as to bring about the desired movement of the respective endless link chains 78 and 79.

As illustrated in Fig. 17, each of the endless link chains 78 and 79 are connected from a predetermined point on the chains to the end of the movable roof section by a connecting link 95, which has one apertured end pivotally connected to one of the links of each of the chains 78 and 79 respectively, and each of which connected links or levers 95 has its other end pivotally connected to an apertured bracket 96, which is secured upon the under surface of the movable roof section and adjacent the end thereof. It will be apparent that this link or lever connection permits both elevation and descent of the movable roof section with respect to the endless chains 78 and 79 through the pivotal movement thereof. The lowered position of said pivoting connecting link 95 is shown at the right of Fig. 17 and the upraised position is shown in dotted lines in the center of said figure.

Reference numeral 92 designates suitably protected electric wires which are secured by a plurality of spaced apart holding elements (not shown) along the inside wall of the body and which wires are connected to the push-button switch 94, which is located near the upper rear corner of the inside side wall of the transportation body in such a way that opening and closing of said switch opens and closes the electric power circuit to the electric motor 89. A suitable power cable 107 mounted on the side wall by spaced brackets 108 at attached plug connection 109, together with suitable extension cord (not shown) provides means for connecting the motor 89 in circuit with any conveniently located stationary wall plug, which is frequently in the vicinity of the transportation body being loaded or unloaded, said extension cord being adapted to be placed within the transportation body when not in use.

Closing of the push-button switch 94 will alternately connect the electric motor 89 in circuit with the source of electric power and the motor will rotate in one direction as far as predetermined and controlled by the automatic reversing mechanism which is directly connected thereto; this, for example, being movement for moving the endless link chains 78 and 79 to pull the elevated roof section into open position. Upon reaching the desired position, as illustrated clearly in dotted lines in Fig. 17, the automatic reversing and circuit breaking mechanism associated with motor 89 will cause said motor to stop at the desired time. When it is desired that the movable slug or roof section be moved to position over the opening in the transportation body, the push-button switch is closed to again energize motor 89 and cause it to run in a reverse direction to cause link chains 78 and 79 to return said slug to position directly over the transportation body opening, from which position it may be lowered through lowering operation of the respective lifting devices or elements illustrated. Similar operation and movement takes place as to that form of movable slug which rides under the stationary roof portion hereinbefore described.

With further reference to Figs. 16 and 17, and to provide manually actuable means for operating the endless link chains 78 and 79 in instances where no electric power is available, I provide a manually operable means for rotating said chains, which includes a pair of sprocket wheels 99, which are journalled on the ends of the central perpendicularly extending shaft or post which extends from each of the mounting flanges or brackets 82 and 83 respectively, and which are secured for concentric rotation with respect to each of the adjacent sprockets 80 and 81 respectively. A pair of sprocket wheels 97, one of which is shown in Fig. 17, are journalled on suitable journal posts which are respectively secured in the body side walls below sprockets 80 and 81 respectively. Each of said sprocket wheels 97 are provided with a central perpendicularly extending non-round stud 97a, illustrated in the drawings as a square stud, which is adapted to receive one end of the removable hand crank 76. An endless link chain 98 connects each of the lower sprockets 97 and the upper corresponding sprocket wheels 99. Manual rotation of the studs 97a and sprocket wheels 97 will transmit rotative movement to sprockets 80 and 81 respectively to cause desired travel of link chains 78 and 79 and the connected movable closure element or slug 72.

Referring to Fig. 18, this view illustrates a side elevation of the intermediate portion of the movable slug or roof section 10 mounted upon substantially right angled brackets 20 which have been previously described with particular reference to Figs. 5 and 8 respectively as being mounted in non-uniform spaced apart relation upon the movable roof section, preferably three thereof being upon each side of the movable roof section 10. The upper intermediate portion of the side wall 14 is shown in side elevation having secured thereon the exterior reinforcing rail 25. Reference numeral 100 designates the upwardly facing shoulder shown also in perspective in Fig. 5, which shoulder is formed due to the formation of the upper edge portion of the side walls 14 as substantially thinner than the lower and major portion of each of said side walls. The narrower upper edge portion of each of the side walls 14, as is illustrated in Figs. 5, 8 and 2, extends over the entire length of the side walls of the transportation body.

Mounted on the exterior surface of the narrower upper portion of the side walls 14 are a plurality of angularly bent track sections 101, which are preferably of right angled cross section the horizontally flanged portion whereof extend outwardly. Each of the track sections 101 are secured so that the major portion thereof lie horizontally and in alignment with the other corresponding track sections 101 upon the same side wall. The downwardly bent portions of the track sections 101 present correspondingly inclined upwardly facing trackage surfaces 102, and said downwardly bent portions preferably terminate in horizontally extending and sections 103 respectively, and on which track sections 103 the respective flange rollers 22 rest when the movable roof section is in closed seated position, as indicated in side elevation in Fig. 18.

It is to be noted that the integral peripheral flanges 22c of the respective rollers 22 roll exteriorly of the horizontally projecting edges of the track sections 101, and that the smaller diameter portions or the rollers 22 ride upon the respective track sections 101, inclined track surfaces 102 and 103 as clearly shown in Fig. 19.

Fig. 19 is a top plan view of the intermediate portion of Fig. 18 with the intermediate portions of the angular brackets 20 broken away to properly show the respective rollers 22 in riding engagement upon the respective track sections 101, 103 and track surfaces 102.

When angularly bent and partially inclined track sections 101 of the type here illustrated and described are utilized, it is unnecessary that any separate means be employed for elevating the movable roof section from closed sealed position, as forward longitudinal movement of the movable roof section 10 will cause the same to simultaneously rise and move longitudinally toward position over the stationary portions of the roof. I have nevertheless illustrated in Fig. 20, a conventional form of jack 104, which in this form are of the hydraulic type actuable by a removable handle (not shown), and which are mounted in inclined position upon an inclined metal wall bracket 105 each of which brackets are adapted to be secured to the inside side walls 14 by a plurality of screws of equivalent securing elements. In instances where two or more jacks 104 are mounted and used for imparting initial elevating and longitudinal movement to the movable roof section 10, as for example one jack on each side wall at desired points between the ends of a closed movable roof section, it is desirable to mount a thrust block 106 by screws or the like to the undersurface of the movable slug 72 at points to be engaged by the movable heads respectively of the lifting jacks or elements 104.

When these inclined lifting jacks 104 are employed as illustrated, it will be apparent that the movable roof section 10 may be moved by operation of said jacks to points wherein the respective rollers 22 will ride upon the horizontal portions of the respective track sections 101 illustrated in Fig. 18, from which position the movable slug may be rolled longitudinally to open position, and later again back to closed seating and sealed position.

It is desirable to so locate and mount the respective brackets 20 so that two of them will not fall into the recesses during longitudinal movement. This is accomplished by mounting the rearmost bracket and the intermediate bracket relatively close together and by making the rearmost track sections 101 relatively short, that is, to traverse only the space between the respective brackets, and further by making the intermediate section 101 relatively longer and spacing the two foremost brackets 20 on the movable slug at a substantially greater distance from the intermediate brackets 20 than the corresponding distance from said intermediate bracket to the rearmost bracket 20.

In the foregoing I have described the construction and operation of my invention with means whereby it may be moved both in vertical direction and longitudinally by manual or manually operable means as well as selectively by power actuated mechanism adapted to be manually controlled as hereinbefore described. The foregoing construction provides vehicle units which permit very material economies in the transportation of goods, and particularly of eliminating "dead head" vehicle operation in one direction which has been unavoidable due to the inapplicability of the transportation body to business and economic factors.

I desire that it be understood that wherever in the specification and claims hereof I have made reference to "power means, power driven mechanism," or equivalent terms as referring to the units for actuating or operating either the lifting devices or the mechanism for moving the closure element, that such terms contemplate the utilization of power means or equivalent power mechanism other than that specifically illustrated and described herein in the preferred form. The equivalent forms of means or mechanism could be adapted for operation by fluid, by compressed air, or by vacuum air units and also by utilization of conventional combustion engine power of the vehicle itself, suitably transmitted to the desired parts.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof. I desire that it be specifically understood that where I have herein and in the claims referred to "enclosed body" or "normally enclosed body" it does not mean or is to be interpreted as a completely sealed body or as one having a complete non-apertured wall, but also means a body whose members may be formed with stakes or trusses with openings therebetween or which are merely sufficient to retain articles of and packages of merchandise.

I claim as my invention:

1. In a transportation body having vertically extending side walls and a stationary roof portion secured to the upper edges of said side walls and covering a portion of said body; a movable roof section for closing and covering the remainder of said body, said movable roof section being adapted to be first moved vertically and then horizontally to unseal the same; track rails on each side wall of said body and mounted below their upper edges respectively; angular brackets on said movable roof section having downwardly extending portions extending below said tracks respectively; and rollers rotatably mounted on the downwardly extending portions of said brackets and adapted to ride on said tracks; each of said tracks having spaced apart recesses therein positioned to correspond with said rollers respectively said rollers providing first for rolling movement on said tracks and said track recesses permitting maximum descent of said movable roof section into sealed position upon the upper edges of said side walls, said movable roof section being adapted to be rolled on said track rails longitudinally of said body and into superposed position to said stationary roof portion.

2. In a transportation body having vertically extending side walls and a stationary roof portion secured to the upper edges of said side walls and covering a portion of said body; a movable roof section for closing and covering the remainder of the said body said movable roof section being movable first vertically and then horizontally to open the same; track rails on each side wall of said body and mounted below their upper edges respectively; angular brackets on said movable roof section having downwardly extending portions extending below said tracks respectively and terminating in integral stop lugs which extend below said rails respectively to prevent removing movement of the movable roof section when in open positions; rollers rotatably mounted on the downwardly extending portions of said brackets and adapted to ride on said tracks, each of said tracks having spaced apart recesses therein positioned to correspond with said rollers respectively to permit maximum descent of said movable roof section into sealed closing position upon the upper edges of said side walls, said removable roof section having a downwardly opening longitudinally extending groove along each lateral edge engaging and overlying the upper edge of each of the side walls when in closed position to form a seal.

3. In a commercial unit for transporting merchandise, an enclosed body having an upper opening and a movable roof section adapted to close and seal said opening, said roof section having longitudinally extending recesses adapted to overlie and engage the edges of the body defining said opening; manually operable means on said body for elevating said roof section from closed to open position to permit sliding of said roof section to expose said opening, said means comprising a plurality of spaced apart jack screws mounted on the body sides and below the edge portions of said roof section, and manually operable mechanism for operating said jack screws.

4. In a commercial unit for transporting merchandise, an enclosed body having an upper opening and a movable roof section adapted to close and seal said opening, said roof section having longitudinally extending recesses adapted to overlie and engage the edges of the body defining said opening; manually operable means connected to said body for elevating said roof section from closed to open position to permit substantially horizontal sliding of said roof section to expose said opening, said means comprising a plurality of spaced apart jack screws mounted on the body sides and below the edge portions of said roof section; a pair of shafts, each shaft having spaced spiral threads threadingly engaging said jack screws and mounted and journalled to operate two or more of said jack screws simultaneously; and manually operable means connected to said body for selectively rotating said shaft to either raise or lower said jack screws and said movable roof section.

5. In an enclosable merchandise transport body having an upwardly movable and horizontally slidable roof section and a portion of the side walls thereof terminating in exposable upper edges; cooperating tongue and groove elements on the exposable side wall upper edges and on the lateral edges of said slidable roof section respectively, adapted when said roof section is in closed position to form an effective seal; a plurality of mechanical lifting screw elements on the body side walls for raising and lowering said movable roof section into and out of sealing position; manually actuable mechanism operatively connected to said screw elements for operating said mechanical lifting elements; tracks mounted on said body and having spaced recesses therein; roller elements rotatably connected to said slidable roof section adapted to engage said tracks during longitudinal movement of said roof section and adapted to move upwardly and downwardly into and out of said track recesses during vertical movements of said roof section.

6. In an enclosable merchandise transport body having an upwardly and downwardly movable and horizontally slidable roof section and a portion of the side walls thereof terminating in exposable upper edges; cooperating tongue and groove elements on the exposable side wall upper edges and on the lateral edges of said slidable roof section respectively, adapted when said roof section is in closed position to form an effective seal; a plurality of gear and screw driven lifting elements on each of the body side walls; manually operable mechanism connected to said body for operating the gear and screw lifting elements on each body side wall; brackets on the upper end of said lifting elements; a roller journalled on each of said brackets; and tracks on the movable roof section, the rollers of the lifting elements on each side of said body engaging said track whereby said movable roof section may be rolled into open position.

7. In a merchandise transportation unit, a normally enclosed body having portions of its side walls and a portion of its roof defining an opening, an upwardly and horizontally movable roof section for sealing said opening; the upper edges of said side walls having a longitudinally extending groove therein; cushioning elements secured along and on both sides of said groove; a metal strip mounted in each of said grooves and extending above the adjacent cushioning elements, said movable roof section having a longitudinally extending downwardly opening recess along each lateral edge adapted to receive the exposed portion of the metal strip on the corresponding side wall to form a seal and a wall-holding element; and cooperating rollers and recessed track rails on said movable roof section and on said side walls respectively whereby said roof section may be rolled longitudinally of said body, said rollers being adapted to move vertically into and out of said track recesses on vertical movement of said slidable roof section and said rollers being adapted to roll on said track rails on longitudinal movements of said roof section.

8. In a merchandise transportation unit, a normally enclosed body having portions of its side walls and a portion of its roof defining an opening, an upwardly and horizontally movable roof section for sealing said opening; the upper edges of said side walls having a longitudinally extending groove therein; cushioning elements secured along and on both sides of said groove; a metal strip mounted in each of said grooves and extending above the adjacent cushioning elements, said movable roof section having a longitudinally extending downwardly opening recess along each lateral edge adapted to receive the exposed portion of the metal strip on the corresponding side wall to form a seal and a wall-holding element; cooperating rollers and recessed track rails on said movable roof section and on said side walls respectively; and manually operable lifting devices on said body for elevating said movable roof section from closed position, said rollers being adapted to move vertically into and out of said track recesses on vertical movement of said slidable roof section and said rollers being adapted to roll on said track rails on longitudinal movements of said roof section.

9. In a merchandise transportation body having an opening and having a horizontally and vertically movable roof section adapted to close said opening; said opening being partially defined by the upper edges of the body side walls; cooperating, interfitting and separable sealing elements on the lateral edge portions of said movable roof section and on the upper edges of said body side walls respectively; track rails on the body side walls and below the upper edges thereof said track rails having recesses therein; brackets connected to said roof section; rollers journalled on said brackets and adapted to roll along said tracks respectively on longitudinal movement of said roof section, said rollers being adapted to move into and out of said track recesses on vertical movements of said roof section; and an elongated handle member hingedly connected to one end of said movable roof section forming means whereby said movable roof section may be manually pushed or pulled in longitudinal movement; and a retaining bracket for holding said handle member adjacent said roof section in operative position.

10. In a merchandise transportation body having an upper opening and having a horizontally and vertically movable roof section adapted to close said opening; said opening being partially defined by the upper edges of the body side walls; cooperating, interfitting and separable sealing elements on the lateral edge portions of said movable roof section and on the upper edges of said body side walls respectively; track rails on the body side walls and below the upper edges thereof, said track rails having recesses therein; brackets connected to said roof section; rollers journalled on said brackets and adapted to roll along said tracks respectively on longitudinal movement of said roof section, said rollers being adapted to move into and out of said track recesses on vertical movements of said movable roof section; manually operable lifting elements for elevating said movable roof section from sealed position; and cooperating separable sealing elements associated with the forward edge of the movable roof section and with the normally adjacent edge of the stationary roof portion for releasably sealing the joint therebetween.

11. In an enclosed vehicle body having a stationary roof section and an upwardly and downwardly movable roof section, power means on said body for raising the said movable roof section a limited distance and for sliding the said section horizontally over the normally forward portion of said vehicle body to a stable position adjacent the stationary roof section to expose the interior section of said body to view, said power means supporting said movable roof section during its longitudinal movement.

12. In a normally enclosed vehicle body having a stationary roof section and an upwardly and downwardly movable roof section, manually operable and controllable mechanism mounted on said vehicle body for raising said movable roof section from normal seated position to permit sliding movement of said movable section with respect to said stationary roof section so that said roof sections are in superposed positions relative to each other to expose the interior of said body from above; and manually operable mechanism on said body for sliding said movable roof section longitudinally, said manually operable mechanism being adapted to support said movable roof section during its longitudinal movement.

13. In a normally enclosed vehicle body having a stationary roof section and an upwardly and downwardly movable roof section, manually operable mechanism on said body for raising said movable roof section from normal seated position to permit sliding movement of said movable section into superposed relative position with said stationary roof section to expose the interior of said body from above, said manually operable mechanism being adapted to support said movable roof section during its longitudinal movement; and power driven mechanism on said body for sliding said movable roof section longitudinally.

14. In a normally enclosed vehicle body having a stationary roof section and a movable roof section; manually operable mechanism on said body for raising said movable roof section from normal seated position to permit sliding movement of said movable section into adjacent position to said stationary roof section to expose the interior of said body from above, said manually operable mechanism being adapted to support said movable section during longitudinal movement thereof; and power driven mechanism on said body for sliding said movable roof section longitudinally, including link chain means pivotally connected to said movable roof section, sprocket wheels on which said link chains are movably mounted and a power driven motor for operating said link chain means.

15. In an enclosed vehicle body having a stationary roof section and a movable roof section, power means on said body for raising the said movable roof section a limited distance and for sliding the said section horizontally into adjacent position with said stationary roof section to expose the interior section of said body to view, said power means being adapted to support said movable roof section during the longitudinal movements thereof.

16. In a vehicle body having vertically extending side walls and a stationary roof portion connecting parts of said side walls and having an upper opening partially defined by said stationary roof portion; a movable roof section for closing said upper opening; a plurality of lifting devices on said body for raising said movable roof section; track rails on said stationary roof portion; bracket-mounted roller elements connected to said movable roof section and adapted to ride on said tracks respectively in longitudinal movement of said movable roof section; and manually operable mechanism on said body and connected to said movable roof section and for moving said movable roof section into and out of closed seated position, said lifting devices being adapted to support said movable roof section in part of its longitudinal movements.

17. In a vehicle body having vertically extending side walls and a stationary roof portion connecting parts of said side walls and having an upper opening partially defined by said stationary roof portion; a movable roof section for closing said upper opening; a plurality of lifting devices on said body for raising said movable roof section; track rails on said stationary roof portion; bracket-mounted roller elements connected to said movable roof section and adapted to ride on said tracks respectively in longitudinal movement of said movable roof section; and manually operable mechanism connected to said movable roof section for moving said movable roof section into and out of closed seated position; said manually operable means including a pair of endless link chains and sprockets for mounting the same with respect to the body side walls, and separate crank operated sprocket and chain means on said body for moving said first mentioned endless link chains to move said movable roof section longitudinally.

18. In a transportation body of the merchandise retaining type having side walls, a stationary roof section and an upwardly movable and slidable roof section adapted to open said body from above; a plurality of track sections mounted on the side walls of said transportation body, said track sections having their corresponding ends bent angularly and downwardly; brackets on said movable roof section; rollers journalled on said brackets adapted to normally engage the downwardly bent portions of said track sections when said movable roof section is in seated position and adapted to roll on the non-bent sections of said tracks during horizontal movement of said movable roof section; and manually operable means connected to said body for pulling and pushing said movable roof section to and from closed position, the opening movement of said movable roof section causing the same to move upwardly and longitudinally during riding engagement of said rollers on said track sections.

19. In a transportation vehicle body of the enclosed type having a stationary roof section and a movable and slidable roof section adapted to open said body from above; a plurality of track sections mounted on the side walls of said stationary body, said track sections having their corresponding ends bent angularly and downwardly; brackets on said movable roof section; rollers journalled on said brackets adapted to normally engage the downwardly bent portions of said track sections when said movable roof section is in seated position; and mechanism connected to said body for moving said movable roof section to and from closed seated position and adapted to be selectively operated either manually or by power driven means.

20. In a transportation vehicle body of the enclosed type having a stationary roof section and an upwardly movable and slidable roof section adapted to open said body from above; a plurality of track sections mounted on the side walls of said stationary body, said track sections having their corresponding ends bent angularly and downwardly; brackets on said movable roof section; rollers journalled on said brackets adapted to normally engage the downwardly bent portions of said track sections when said movable roof section is in seated position; mechanism connected to said body for moving said movable roof section to and from closed seated position and adapted to be selectively operated either manually or by power driven means and including a pair of endless link chains, sprockets mounted with respect to side walls; a pivotal connection between said chains and said movable roof section, and manually controllable power driven mechanism for moving said endless link chains simultaneously in either direction to thereby move said movable roof section from and into closed seated position.

21. In a transportation body having side walls and a stationary roof section connecting portions of said side walls; an upwardly movable roof section; spaced apart track rails connected to said stationary roof portion; bracket mounted roller elements on said movable roof section adapted to engage said track rails; a plurality of manually operable lifting devices mounted below said movable roof section; roller elements on the upper ends of said lifting devices, said movable roof section being adapted to ride on said rollers of said lifting devices during partial longitudinal movement; and cooperating sealing members between the edge portions of said movable roof section, said stationary roof section and said side walls.

22. In a transportation body having an upper roof opening, a movable closure element for said opening; rails on said body; roller elements rotatably connected to said closure element and adapted to ride on said rails when said movable closure element is moved horizontally after said movable closure element is raised, and means connected to said body for moving said closure element vertically and horizontally into and out of closing position.

23. In a transportation body having a stationary roof section and a movable roof section, means connected to said body for moving the said movable roof section vertically and whereby said movable roof section is adapted to be moved horizontally to superposed position with said stationary roof section to expose the interior of said body to view.

24. In combination, a transportation body having a stationary roof section and a movable roof section, and means connected to said body for moving the said movable roof section diagonally in upwardly and downwardly inclined directions and for sliding the said movable roof section horizontally to a superposed position with said stationary roof section to expose the interior of said body.

25. In a merchandise transport unit, a body having a floor and side walls, stationary roof portions, a portion of the body being openable from the top, a portion of the side walls terminating in longitudinally tongued upper edges; a vertically and horizontally movable roof section for closing said body opening and having longitudinal recesses along the lateral edges adapted to cooperate with said tongues respectively to form an effective seal; longitudinal track rails on said side walls having recesses therein; bracket-mounted rollers connected with said slidable roof section adapted to ride on said rails respectively; said rollers being adapted to move through said recesses when said movable roof section is moved vertically; and manually operable mechanism on said body for elevating and lowering said movable roof section out of and into closed sealing position.

26. In a merchandise transport unit, a body having a floor and side walls, stationary roof portions, a portion of the body being openable from the top, a portion of the side walls terminating in longitudinally tongued upper edges; an upwardly and horizontally movable roof section for closing said body opening and having longitudinal recesses along the lateral edges adapted to cooperate with said tongued upper edges respectively to form an effective seal; longitudinal track rails on the body side walls respectively and having spaced recesses therein, said track rails extending below the stationary roof portions; brackets on said slidable roof section having portions extending downwardly below said track rails; rollers journalled on the lower ends of said brackets and adapted to drop through said track rail recesses respectively; and manually operable gear driven mechanism connected to said body for elevating or lowering said movable roof section out of or into sealing position.

27. In a merchandise transport unit, a body having a floor and side walls, stationary roof portions, a portion of the body being openable from the top, a portion of the side walls terminating in longitudinally tongued upper edges; an upwardly and horizontally movable roof section for closing said body opening and having longitudinal recesses along the lateral edges adapted to cooperate with said tongues respectively to form an effective seal; longitudinal track rails on the body side walls respectively and having spaced recesses therein, said track rails extending below the stationary roof portions; brackets on said slidable roof section having portions extending downwardly below said track rails and outside thereof; rollers journalled on the lower ends of said brackets permitting horizontal movement of said movable roof section; said rollers being adapted to drop through said track rail recesses respectively to permit said slidable roof section to seat into sealing position; said rollers engaging said track rails during horizontal movement of said movable roof section; and a plurality of spaced screw jacks mounted on each of said body side walls for moving said roof section vertically; and manually rotatable mechanism connected to said body for operating two or more of said jacks in unison and including a shaft operatively connected to two or more of said jacks and a ratchet crank for rotating said shaft.

28. In an enclosable merchandise transport body having an upwardly and downwardly movable and horizontally slidable roof section and a portion of the side walls thereof terminating in exposable upper edges; cooperating tongue and groove elements on the exposable side wall upper edges and on the lateral edges of said slidable roof section respectively, adapted when said roof section is in closed position, to form an effective seal; a plurality of gear driven jack screws mounted on the inside walls respectively of said body adapted when operated to elevate said movable roof section; a shaft having a journalled connection to said body and having spiral screw threads engaging the jack screws on each body side wall; and manually actuable mechanism on said body for rotating each of said shafts to elevate or to permit descent of said movable roof section respectively; tracks on said body having spaced recesses therein; roller means on said movable roof section to permit longitudinal rolling and guided movement of said slidable roof section to and from positions thereof adjacent said stationary portion of said roof, said rollers being adapted to move vertically into and out of said track recesses during vertical movements of said movable roof section, and being adapted to engage said tracks during longitudinal movements of said roof section.

29. In combination with a normally enclosed merchandise transportation body having an upwardly and downwardly movable roof section and slidable substantially horizontally; tracks on said body having recesses therein; and roller means on said movable roof section, the rollers of said roller means being adapted to move vertically into and out of said track recesses on vertical movements of said roof section, and being adapted to engage said tracks on longitudinal movement of said roof section; a plurality of lifting elements connected with said body and for elevating said roof section from closed position to permit sliding movement thereof, each lifting element comprising a housing, a vertically movable screw, a gear wheel having spiral threads engaging said vertical screw threads, and a manually rotatable shaft and spiral pinion thereon for transmitting rotative movement thereof to vertical movement of said screw.

30. In combination with a normally enclosed merchandise transportation body having an upwardly and downwardly movable and horizontally slidable roof section, and cooperating track and roller means on said body and on said movable roof section, said tracks being recessed and said rollers being adapted to be raised or lowered out of and into said track recesses, said rollers being adapted to ride on said tracks during longitudinal movement of said roof section, a plurality of lifting elements connected with said body and for elevating said roof section from closed position to permit sliding movement thereof, each lifting element comprising a housing, a vertically movable screw, a gear wheel having spiral threads engaging said vertical screw threads, a journalled shaft along each set of aligned lifting elements and having spiral threads engaging said gear wheels respectively; a ratchet wheel on said shaft and a lever and lockable ratchet element for rotating said shaft.

CARL MARINELLO.